April 6, 1965  J. W. BRADLEY  3,176,601
STEP-AND-REPEAT MACHINE
Filed Dec. 3, 1962  6 Sheets-Sheet 5
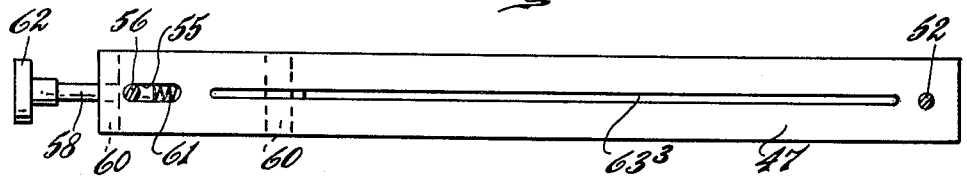
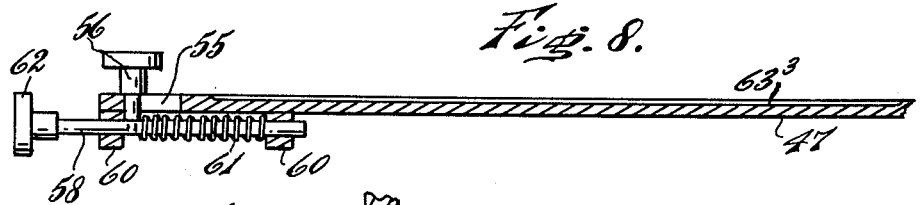
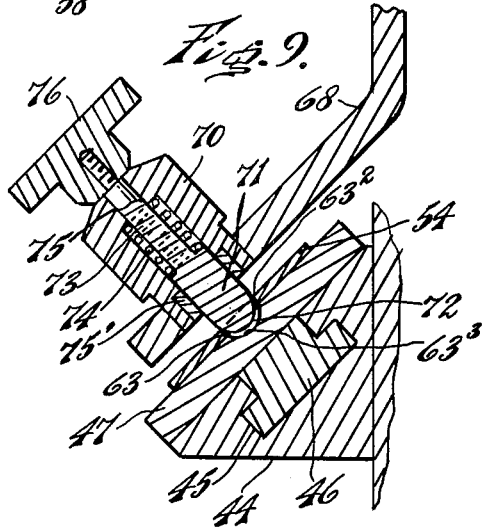
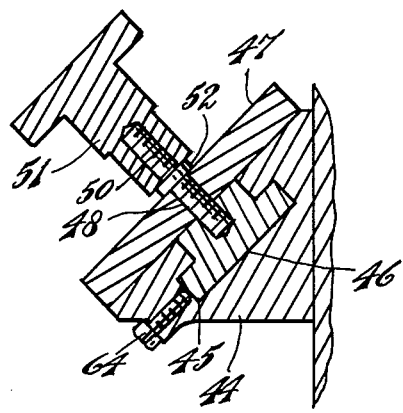
INVENTOR
James W. Bradley
BY
ATTORNEYS

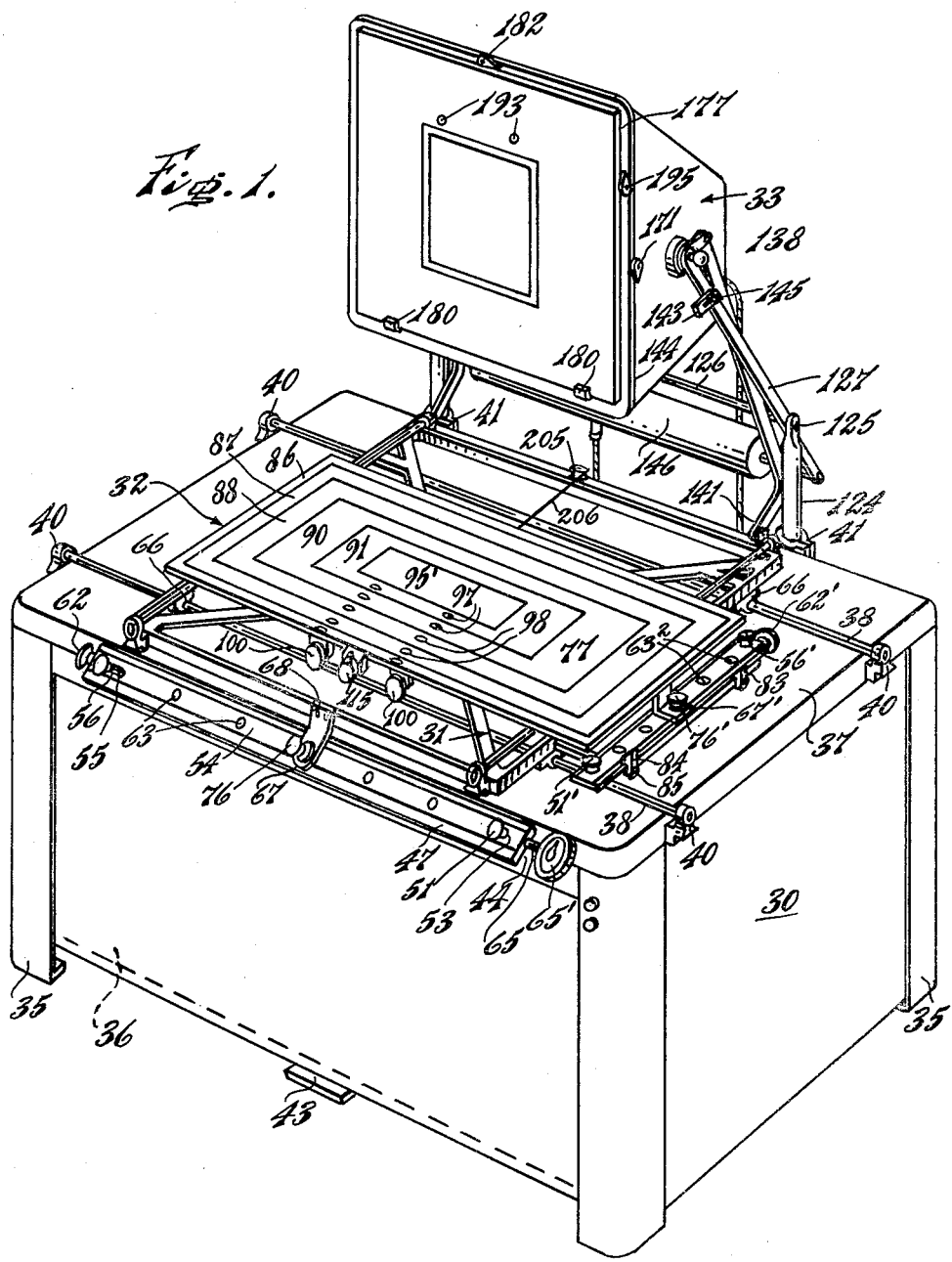

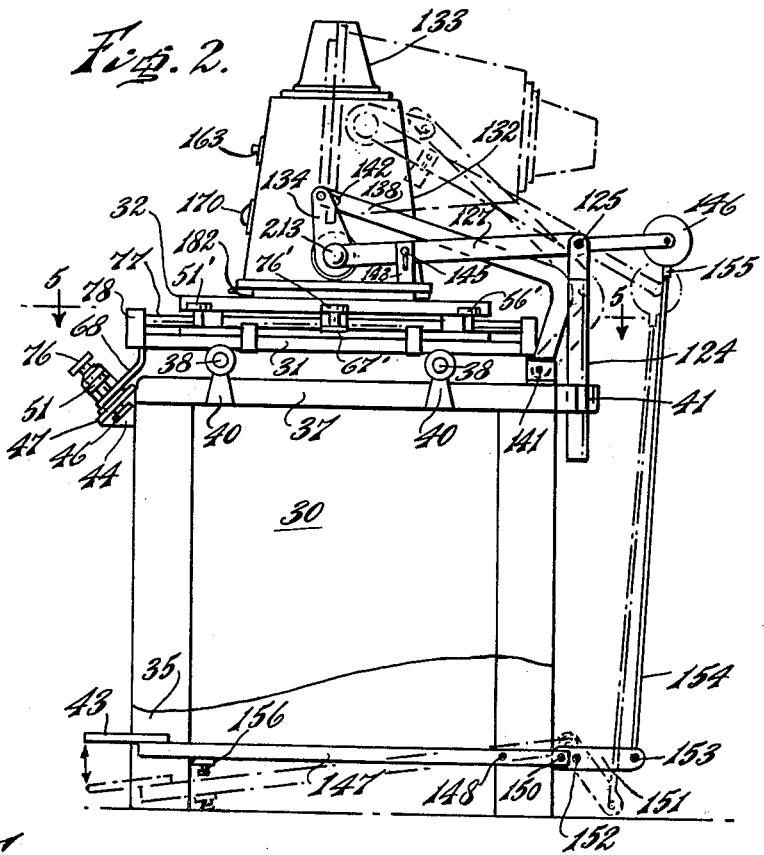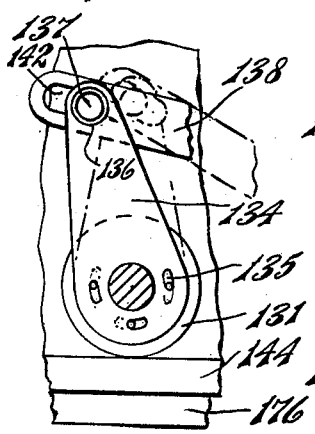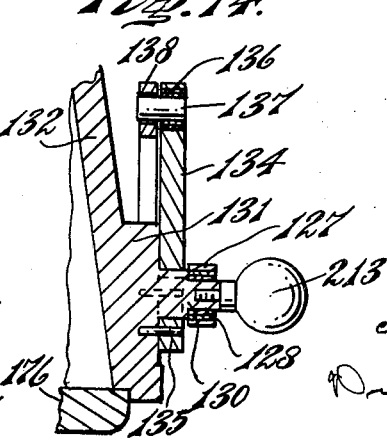

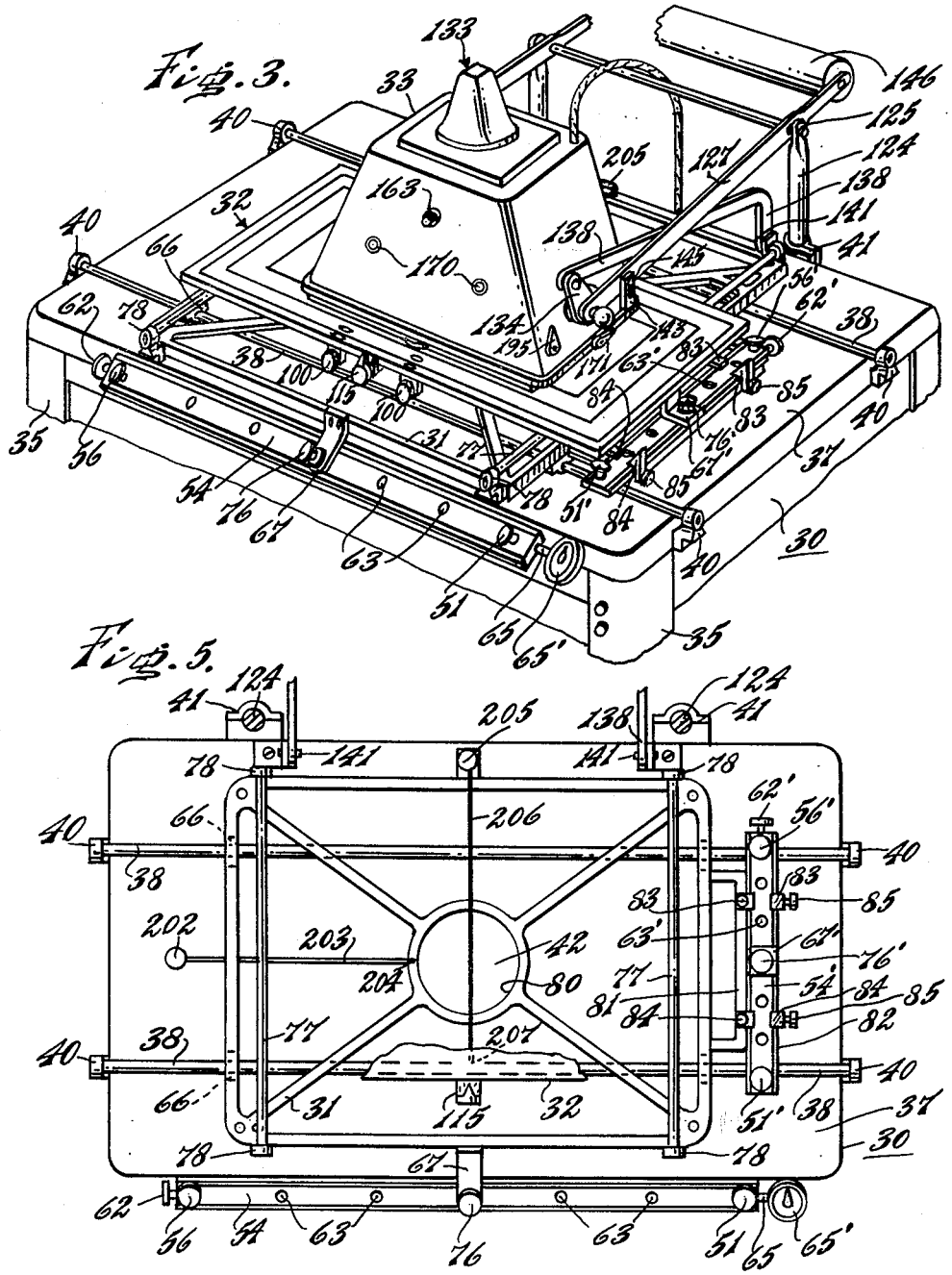

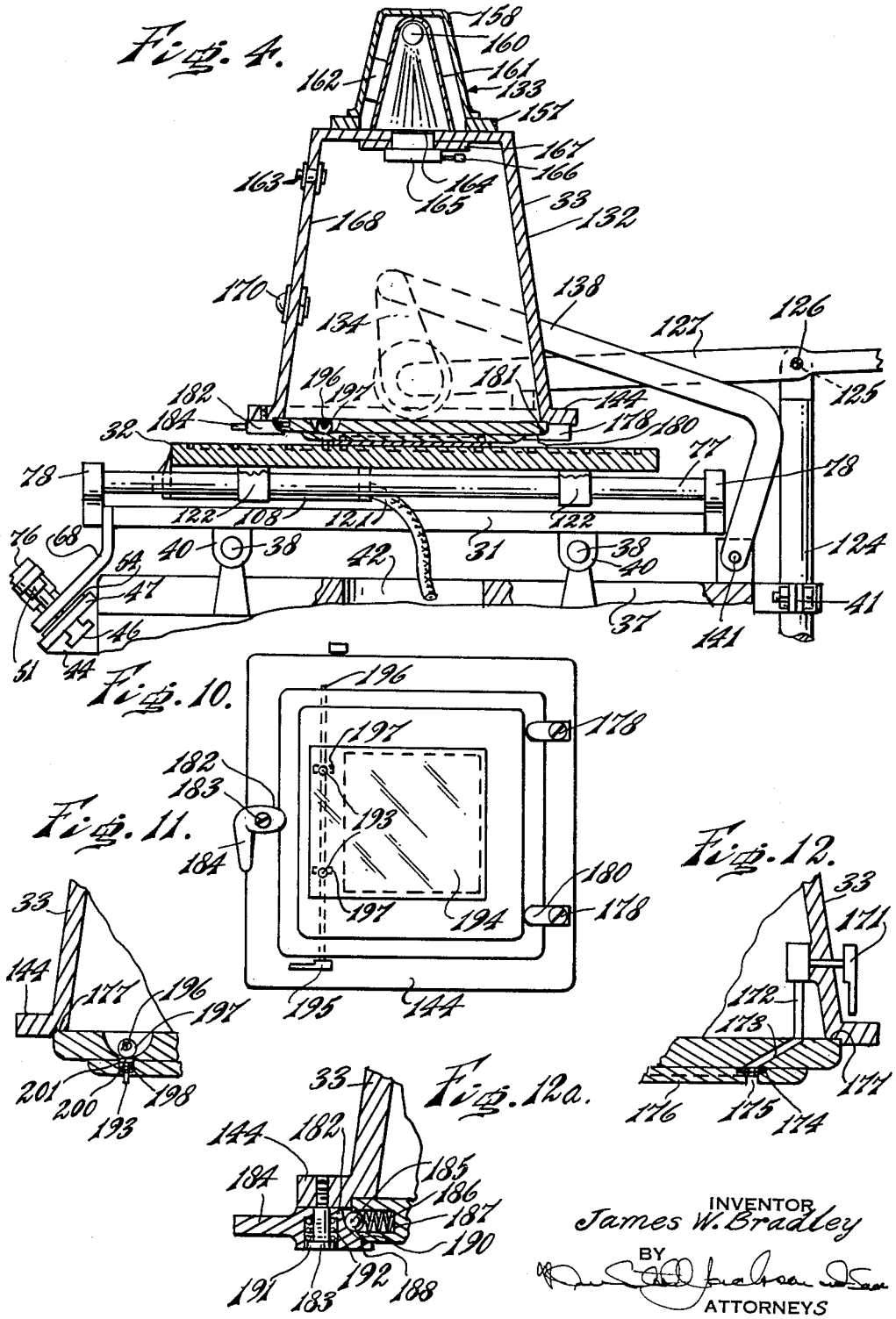

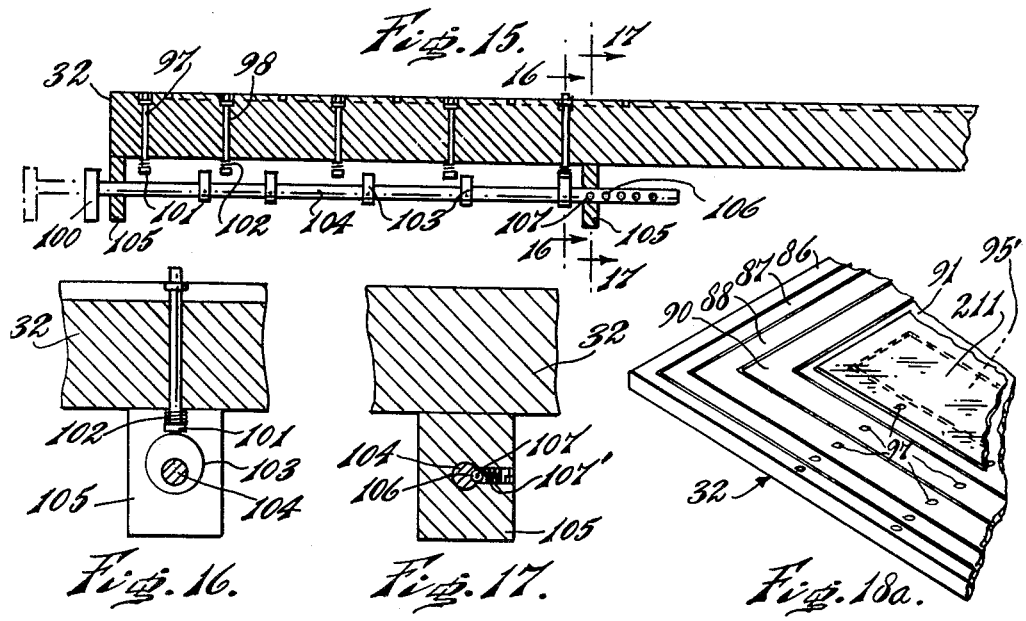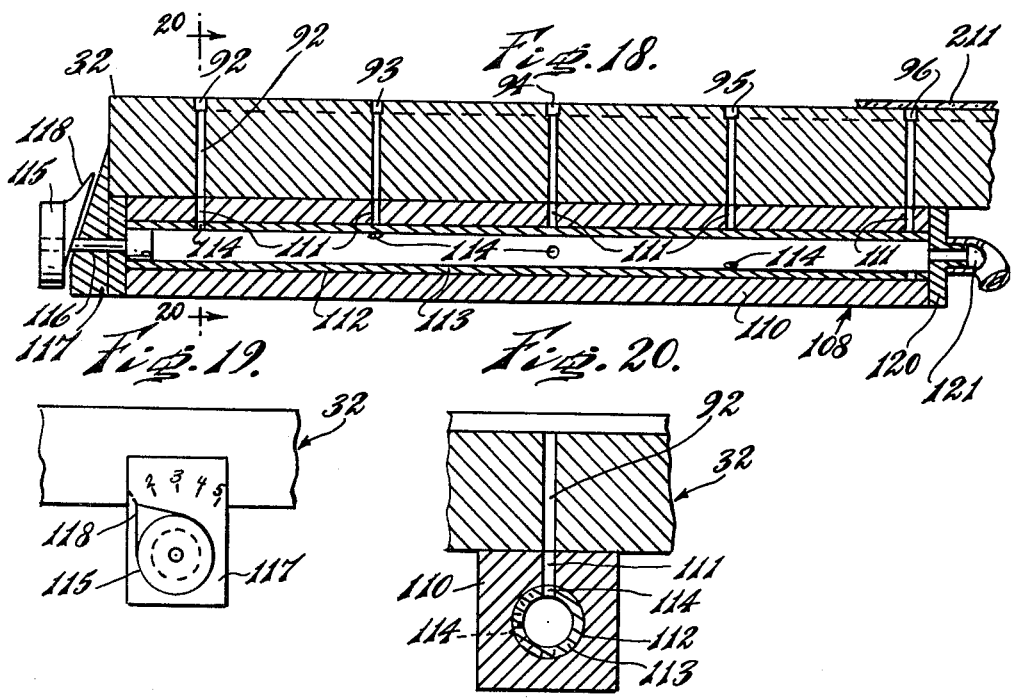

United States Patent Office 3,176,601
Patented Apr. 6, 1965

3,176,601
STEP-AND-REPEAT MACHINE
James W. Bradley, 1185 Oakdale Road, Atlanta, Ga.
Filed Dec. 3, 1962, Ser. No. 241,850
7 Claims. (Cl. 95—76)

This invention relates to photocomposing or step-and-repeat machines for duplicating photographically a series of exposures, and more particularly to the indexing mechanism for these machines.

A purpose of the invention is to accurately position a plate or film relative to an exposing head in a plurality of positions in a step-and-repeat machine.

A further purpose is to accurately duplicate the position of a plate or film relative to an exposing head in a plurality of positions.

A further purpose is to position a step-and-repeat machine by aligning two members through the use of an oversized ball and a hole.

A further purpose is to eliminate the effect of wear on the accuracy of positioning and duplicating positioning in a step-and-repeat machine.

A further purpose is to eliminate the need for clearance in the indexing mechanisms of a step-and-repeat machine.

A further purpose is to use changeable control strips to obtain particular spacings.

A further purpose is to use a combination of selected control strips to obtain required longitudinal and transverse spacing.

A further purpose is to obtain spacing of a series of exposures on a first plate or film and then obtain spacing of a series of exposures on a second plate or film wherein the spacings on the first and second plates or films are exact duplicates.

A further purpose is to achieve an accuracy in the step increments unobtainable in present day machines.

A further purpose is to provide speeds in the step-and-repeat procedures much greater than hitherto obtainable.

A further purpose is to eliminate manual cross-line or register mark registry between elements being stepped.

A further purpose is to eliminate the necessity for taping or gluing down of the film being stepped.

A further purpose is to eliminate the necessity for masking of marginal areas of the film or transparency being stepped.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 1 is a perspective view of the machine of the invention showing the exposing head raised.

FIGURE 2 is a right side elevation of the machine of FIGURE 1 with the exposing head lowered.

FIGURE 3 is a partial perspective showing the exposing head in a lowered position.

FIGURE 4 is a fragmentary vertical sectional view of the machine of FIGURE 1.

FIGURE 5 is a plan view taken on the line 5—5 of FIGURE 2.

FIGURE 6 is an enlarged vertical section of the mounting assembly for the control strip.

FIGURE 7 is a plan view of the longitudinal control strip support.

FIGURE 8 is a vertical section of the strip of FIGURE 7.

FIGURE 9 is a vertical section of the indexing assembly.

FIGURE 10 is a front elevation of the exposing head showing a transparency in position.

FIGURE 11 is an enlarged fragmentary section showing the chase supported in the exposing head.

FIGURE 12 is a fragmentary enlarged sectional view showing the vacuum lines to the chase.

FIGURE 12a is an enlarged fragmentary vertical section showing the cam means for locating the chase in the exposing head.

FIGURE 13 is a fragmentary elevational view showing the arms for supporting the exposing head.

FIGURE 14 shows the trunnions and lever arms in a front sectional view.

FIGURE 15 is a sectional elevation showing the vacuum board and registry pins.

FIGURE 16 is an enlarged fragmentary section taken on the line 16—16 of FIGURE 15.

FIGURE 17 is an enlarged fragmentary view taken on the line 17—17 of FIGURE 16.

FIGURE 18 is a vertical section showing the vacuum valve and vacuum board.

FIGURE 18a is a fragmentary perspective of the vacuum board with a template in place.

FIGURE 19 is a front elevation of the index knob.

FIGURE 20 is a sectional view taken on the line 20—20 of FIGURE 18.

Describing in illustration but not in limitation and referring to the drawings:

Of great importance to the graphic arts, the etched circuits, the chemical milling and the electronic industries in particular are photocomposing (step-and-repeat) machines. They facilitate accurate placement of images in any predetermined position on the surface of sensitized plates or films, thus rendering possible duplicate (repeat) prints.

For instance, in color printing, where a plurality of color separated negatives are used to produce plates adapted to print the individual colors, it is necessary to exactly duplicate the spacings of the images on the respective plates so that exact registry of the final color print is obtained. This spacing is achieved by exact positioning of the plate relative to the exposing head for each successive exposure of the image on the plate.

Extensive use has been made in the prior art of helical screws and followers to obtain the translation necessary between the plate and image exposing head. It has been found, however, that due to the clearance necessary and wear developed between the screw and follower, play or lost motion is present which makes it difficult and hazardous to obtain and duplicate precise positioning of the plate with respect to the exposing head.

In the present invention, a control strip having precisely spaced holes is fixed to the base of the machine and a biased ball having a diameter greater than the hole diameter is fixed to a slidable plate support. The ball is selectively engaged with one of the spaced holes whereby the plate is positioned at the center line of the hole. The initial size of the hole, the initial size of the ball, the wearing of the ball and the wearing of the hole have no bearing on accuracy. The center line of the hole and the center line of the ball are controlling, and these do not change with wear or size. Furthermore, no play or clearance between the ball and hole is needed, or created with wear, so that accuracy is constantly obtained.

Furthermore, since holes can be readily made by punching in the strip, such as a metallic strip, it is very easy to place centers at any required spacing. This means that master center spacing strips can be available in a variety of selected distances or combination of distances or custom strips quickly and accurately prepared and these can be used as required when reproducing similar center positions later on. When the strips are used to control coordinate positions as right angles to one another, a combination of punched strips can be employed to obtain the variation required for a particular job.

The machine

Considering the forms shown in the drawings, the main components of the machine comprise a base 30, a spider 31, a vacuum board 32 and an exposing head 33.

The base

The base 30 comprises legs 35, a indent 36 and a base table 37 which is precisely oriented and precisely level. The base supports a pair of hardened and accurately ground longitudinal guide shafts 38 which are precisely parallel and level and supported by pillow blocks 40 at the ends securely bolted to the table.

The legs will desirably have leveling screws to make sure that everything is set up precisely level.

At the back of the table are mounted clamping supports 41 which will later be described as supporting the exposing head 33. The table has an opening 42 through which any desired vacuum and electric lines can be brought up from the bottom of the machine.

Underneath the table in the ident 36 is an automatically controlled vacuum pump with associated codes and regulators, and an associated surge tank not shown.

At the front of the table is illustrated a foot pedal 43 which will later be described as raising the head 33.

On the front of the table is a support 44 securely bolted to the front of the table, and having a T-slot 45 which receives at suitable spaced intervals T-bars 46 securely bolted to longitudinal control strip support 47. The longitudinal control strip support 47 at one end, suitably the right end of the machine, is provided with a permanently fixed pin 48 securely fastened to the strip support 47 and having threads 50 which engage a clamping knob 51.

The pin 48 has an accurately machined portion 52 which is of the correct size to engage the endmost positioning hole 53 in the longitudinal control strip 54. At the opposite end of the strip 54, there is a positioning slot 55 which receives an anchoring pin 56 which is secured in plunger 58 as best seen in FIGURES 7 and 8. Plunger 58 slides in permanent longitudinal bearings 60 mounted on the bottom of the strip support 47.

A helical compression spring 61 acts between one of the longitudinal bearings and the pin 56 to urge the plunger to the level in FIGURE 1 and a knob 62 on the outer end of the plunger permits compression of the plunger 58. The object of the spring loaded plunger mechanism is to exert a constant tension on the longitudinal control strip 54 in which indexing holes 63 have been punched. Indexing holes 63 are precisely positioned at desired step-and-repeat increments.

The T-bar 46 mounting strip support 47 is adjustable in a left and right direction in T-slot 45 by releasing clamping screws 64 which are accessible from beneath the strip support. The strip support 47 engages the movable follower 65 on dial indicator 65′ permanently mounted to the front of the machine. The follower 65 rides against the end of the strip support 47 and therefore indicates right and left movements of the support 47 in fractions of thousandths of an inch.

The spider

The spider 31 has bearing blocks 66 mounted to its bottom side and the bearing blocks 66 house adjustable precision linear ball bearings which ride on the longitudinal guide shafts 38 and are adjusted to zero tolerance.

The spider has an indexing assembly 67 as best seen in FIGURE 9 which consists of an index bracket 68 secured to the spider 31 and mounting an index housing 70 which secures an indexing plunger 71 having a precise hardened spherical end 72 which engages into but cannot penetrate through any indexing hole 63 in the longitudinal control strip 54.

Strip support 47 has a milled recess $63^3$ coincident with the location of the indexing holes 63 and with the indexing plunger 71 which permits the plunger to self center into the control strip 54 without interference from the strip holder 47. At the same time the longitudinal control strip 54 has adequate support for the portion of the strip at $63^2$ so that it cannot be distorted or bowed in by the spring pressure.

The indexing plunger 71 has a reduced portion 73 which receives a helical compression spring 74 and the reduced portion 73 extends through a guiding portion 75 of the housing 70 and receives a threaded knob 76 which acts as a lifting head for the indexing plunger 71. The large bottom portion of the indexing plunger extends through a lapped bronze bushing 75′ pressed into the housing 70.

Thus, by retracting the indexing plunger 71, the spider 31 is disengaged and can ride to a new indexing hole 63 in the longitudinal control strip 54. When the plunger enters an indexing hole 63, it will precisely center under the action of the spring 74. The spherical end 72 of the spring loaded indexing plunger 71 is of a diameter greater than the diameter of the indexing hole 63 punched in the longitudinal control strip 54 so that the plunger 71 is prevented from completely penetrating the hole, but rather, the plunger is self centered into the indexing hole 63. Thus, in a particular example, good results were obtained where the longitudinal control strip had an indexing hole diameter of ½ inch and the diameter of the spherical end 72 was 9/16 of an inch.

The spider 31 has transverse guide shafts 77 which are precisely secured in brackets 78 at the ends of the spider 31 so that the shafts 77 are exactly horizontal and exactly parallel to one another and extend exactly at right angles to the shafts 38 already described.

The spider has an opening 80 corresponding to the opening 42 in the table top to permit the lines for vacuum and electrical energization to be carried up as desired.

At the right side as best seen in FIGURE 5, the spider has a bracket extension 81 to which is mounted a transverse control strip support 82 identical in construction to the longitudinal control strip support 47 on the front of the machine except for length. The transverse control strip support 82 is engaged at the back by cooperating dogs 83 and at the front by dogs 84 which are clamped by clamp screws 85 so that the strip support 82 can be loosened and adjusted front to back to any desired position and then clamped in the new position.

For the purpose of indicating that the transverse control strip 54′ is supported in the same way on the strip support 82 as on the strip support 47, primes are applied to the corresponding components so that a suitable anchorage is provided at 51′ and a spring loaded movable plunger is provided at 62′ having an anchoring pin 56′.

The transverse control strip support 82 and the longitudinal control strip support 47 are structurally alike except for length.

Vacuum plate

The vacuum board 32 comprises a series of zones 86, 87, 88, 90, 91 and 95′ or additional zones as required separated by vacuum channels 92, 93, 94, 95 and 96.

Each of the zones has a pair of precisely and uniformly spaced receding registry pins 97 which operate in holes 98 extending vertically through the vacuum board, and are controlled by operating handles 100 as best seen in FIGURES 1 and 15. Each of the film registry pins 97 has a head 101 and receives a helical compression spring 102 to retract the pin. Each of the pins 97 is selectively activated by one of the cams 103 on cam shafts 104 journalled in bearings 105. The cams 103 are distributed along the shafts 104 selectively.

Each of the shafts 104 is rotatable and slidable longitudinally in the bearing blocks 105. Each shaft 104 has longitudinally spaced detent depressions 106 adapted to engage detent 107 biased by spring 107′. The depressions 106 are positioned to correspond to the cam positions of cams 103, and, as best seen in FIGURE 17, the operator can selectively engage any registry pin 97. Thus, after first pulling the shaft 104 to the correct position by noting the clicks, the operator can subsequently rotate the shaft 104 and raise any desired pin 97.

The vacuum distribution valve 108 as seen in FIGURE 18 has a valve body 110 which has distributed along its length a series of ports 111 each of which connects with one of the vacuum channels 92 to 96 inclusive.

The body 110 of the valve has a cylindrical bore 112 which is precisely lapped to make a tight fit with the outside of a tubular valve element 113 having a series of ports 114 which are located at different angular positions and can be brought into alignment with the appropriate port 111 by proper angular turn of the valve by the action of the knob 115 which passes through opening 116 in end plate 117. The knob 115 is provided with an index 118 which registers with an appropriate series of position indications on the front of the valve.

The rear of the body is closed by cover plate 120 which has vacuum connection 121.

The vacuum board 32 carries an indexing assembly 67' which is identical in function and construction with the indexing assembly 67 previously described in respect to the longitudinal motion of the spider 31, and it will be indicated by similar reference characters, applying primes to distinguish.

The vacuum board 32 has longitudinal bearing supports 122 to carry precision linear ball bearings which move on guide shafts 77 in a forward and rearward, or transverse direction. Motion in a transverse direction is controlled by engagement of the indexing assembly 67' in the transverse control strip 54' in a manner similar to longitudinal control by the indexing assembly 67 and the longitudinal control strip 54.

The clamp supports 41 at the back of the table mount main head bearing supports 124, which at their upper ends support self aligning ball bearings 125 which journal a shaft 126. The shaft 126 has keyed thereon head support arms 127 which at the forward end support ball bearings 128 which journal trunnions 130 mounted on bosses 131 at the opposite sides of the exposing head 33.

*Exposing head*

The exposing head 33 comprises essentially a chamber mounting a suitable illuminator 133, preferably an electronic flash of character well known in the art.

The bosses 131 have secured thereto an adjustable lever arm 134 of suitable dimensions to effect the desired rotation of the head 33 as it moves up so that it can be vertical in the upper position and horizontal in the lower position. Adjustment is provided by slot and screw connections 135 to the bosses 131 as best seen in FIGURE 13.

At the outer ends, levers 134 carry ball bearings 136 which pivotally engage at 137 with an additional lever arm 138 of angle formation permanently pivotally connected at 141 to the back of the table of the machine.

The dimensions and shape of the lever arm 138 engaging adjustable lever arm 134 are such that the rotation of the head 33 is activated to a precise horizontal position when it is lowered to the vacuum board 32 and rotated through an angle of approximately 100 degrees in the raised position. If the front of the head 33 is slightly inclined back of the vertical in raised position, it is easier to mount the film and operate the pins as later described.

The engagement of the lever arm 138 with the lever arm 134 is effected through a ball bearing operating in a slot in lever arm 138 of suitable dimensions to permit the return of the head 33 from the raised position to the lowered position to an absolute parallelism with the vacuum board 32 and subsequently raising the exposing head 33 through the action of foot pedal 43 for a distance of approximately ¼ of an inch and maintaining the absolute parallelism of said head with said vacuum board.

In order to permit the front of the exposing head 33 to reach parallel position and still retain that parallel position when the head is raised approximately ¼ of an inch above the vacuum board 32, an elongated slot 142 is provided between the ball bearing 136 on the end of the adjustable lever arm 134 and the end of the lever 138, which provides a slight amount of lost motion since the head can raise a slight amount before the lever 138 acts to induce rotation of the head.

To assure that the head will remain absolutely parallel to the vacuum board 32, the head is weighted to the front, and adjustable barrier arm 143 extends down from the arm 127 to engage the flange 144 on the bottom of the exposing head 33 preventing forward rotation beyond parallel. The barrier arm 143 is adjustable by a bolt and slot connection to the arm 127 at 145.

At the rear, the arms 127 extend beyond the shaft 126 and provide a counterweight 146.

The pivotable position relation to the exposing head 33 and the counterweight 146 and the weights of said elements are such that when the head is in a fully raised position, a weight shift is induced favorable to the counterweight 146, thus holding the exposing head 33 securely in its fully raised position. As the exposing head 33 is lowered, the weight relationship tends to balance and at a position of the exposing head 33 approximately halfway between the fully raised and fully lowered position, there is a perfect counterbalance.

As the head 33 is further lowered, the shift in the center of gravity is towards the exposing head 33 and in the fully lowered position a weight force is applied between the exposing head 33 and the vacuum board 32. This is brought about by the rotation of the exposing head 33 wherein the center of gravity of the exposing head is being moved away from the bearings 125 as the exposing head is lowered and brought toward the bearings 125 as the exposing head is raised, when considering distances in terms of projected distance to the horizontal.

Foot pedal 43 is on the forward end of foot pedal lever 147 which is pivoted to the base suitably toward the rear of the machine at 148 and the rearward end of 147 is pivotally connected at 150 to link 151 pivotally fixed to the base at 152. At the rearward end the link 151 is secured at 153 to the lower end of cable 154, the upper end of which is anchored at 155 to counterweight 146.

There is an adjustment provided at 156 so that the foot pedal 43 can be depressed only a predetermined distance which will raise the exposing head 33 a small distance from the vacuum board 32 but not sufficient to induce rotation.

The exposing head consists of a suitably shaped cast body 132. At the top is a plate 157 to which is mounted a suitable electronic flash unit 158.

In the exposing head 33 at the top, the electronic flash unit 158 includes a flash bulb 160 and a reflector 161, of conventional manufacture. The unit as well known has a condenser 162 which charges when connected to an electric current and discharges through the flash bulb 160 producing the light upon closure of normally open spring biased push button switch 163.

In order to prevent the image of the lamp from showing on the work when small apertures are used, a suitable diffusing screen 164 is interposed between the bulb 160 and the iris diaphragm 165. The iris diaphragm aperture is adjusted through lever 166 to a calibrated scale suitably mounted on the flange 167 to which the iris diaphragm 165 is mounted. The entire interior of the chamber is suitably blackened at 168 so as to avoid any reflection. Suitable small red fresnal lenses 170 are provided over openings for observation of the flash operation.

Inside the light chamber is mounted a valve controlled by lever 171 through which vacuum line 172 connects to a passage 173 which connects at gasket 174 to surface vacuum channel 175 in chase 176.

The forward end of the chamber near the flange 144 has an accurately machined inner suitably rectangular surface 177 to which the chase is secured, preferably by accurately machined locator pins 178 having hook extensions 180 which receive locator surfaces 181 on the adjoining face of the chase 190. At the opposite side, the chase is locked in place suitably by locating cam 182 pivoted at 183 and having an operating handle 184 which engages and is capable of depressing a spring loaded ball 185 which is spring urged by helical compression spring 186 in spring well 187.

When the chase is in position, the high side of the cam exerts pressure against the ball and urges the chase 176 into engagement with the pins 178 to hold the chase solidly and accurately in position.

The cam projection 188 also protrudes below the curved edge of the chase 190 and the cam pivot 183 includes an enlarged portion 191 which acts as a spring retainer for a helical compression spring 192 which surrounds the pivot 183 and urges the chase in intimate contact with a corroborating fixed portion of the exposing head 33.

The chase includes pins 193 of suitable center distance and size, to fit the size film being used on the particular chase. It will be evident that different chases will be provided having different openings and different transparent inserts 194.

The spacing distance will be exactly in conformity with the spacing distance of, for instance, the pins in the punching heads of a punch as set forth in my accompanying application Serial No. 218,045, filed August 20, 1962, for Registry Punch.

To cause the pins 193 to protrude from the chase, it is necessary to operate lever 195 on shaft 196 which carries cams 197 which engage head portions 198 on the pins 193, the heads being spring urged by helical compression springs 200 located in suitable spring wells 201 toward the direction of retraction.

To the spider 31 is attached a negator motor 202 permanently attached to the base and the cable 203 from the motor that exerts a force is then brought forward and attached to the spider at 204. The negator motor 202 biases the spider to the left of the machine, thus maintaining a constant tension as shown in FIGURE 1. Another negator motor 205 is attached to the back of the spider and the extended cord 206 is suitably attached to the underside of the vacuum board at 207, thus exercising a firm and constant pressure rearward on the vacuum board 32. This always biases against the possibility that any play could cause inaccuracy.

*Operation*

In operation of the device of the invention, in the preferred manner, a transparency 194 is obtained. Normally, this will be one of a set of color separation negatives made photographically but in some cases it may be a transparency produced manually or otherwise such as a wiring diagram or the like.

In the preferred positioning method, the transparency 194 which may be a negative or the positive will be punched in the margin area to form openings spaced a predetermined distance corresponding to the pin 193 spacing, size, and location of the chase 190. By activating lever 195, the pins 193 are raised to protrude beyond the front surface of the chase, and the positive or negative 194 is placed in position over the pins.

It will be evident that where the transparencies 194 form a set of color separation negatives, the spacing of the holes in the transparencies will be identical on all members of the set so that registry is obtained automatically for successive exposures of the different negatives mounted on the pins 193. This positioning and squaring up of the element of the negative or positive is achieved through the operation, for instance, of Registry Punch, application Serial No. 218,045 above referred to.

As soon as a positive or negative 194 has been properly positioned on the pins 193, lever 171 is activated to apply vacuum in the vacuum channel 175 and cause the negative or positive 194 to adhere firmly to the front of the chase. The pins 193 are then receded by the activation of lever 195, thus preparing the negative or positive for stepping. No examining and no taping of the negative is required or is desirable. Taping is undesirable because it disturbs the planarity of the negative or positive 194 with respect to the plane front surface of the chase and therefore separates the intimate contact of the negative or positive from the film or plate on which stepping is being effected. This prepares the exposing head 33 for stepping.

The next operation is to properly punch the film on which stepping is to be made.

Film or plate 211, as shown in FIGURES 18 and 18a, is the medium on which stepping is to be accomplished. This film or plate is punched with openings which have a predetermined size, location, and spacing corresponding to the predetermined size, location, and spacing of the pins 97 on the vacuum board 32.

By activation of cams 103, the pins 97 are raised and with the exposing head 33 fully raised, the film or plate 211 can be properly positioned over the pins. Then vacuum channel control knob 115 is activated to turn on the vacuum at the proper channel for the film being used. The locator pins 97 are then retracted by turning counterclockwise operating handles 100 shown in FIGURES 1 and 15.

Control strips 54 and 54′ may be available, previously punched, with indexing holes 63 at the proper increments. If not, strips will be prepared by punching on Microset Punch, as shown in application Serial No. 241,-794, filed December 3, 1962. The strips 54 and 54′ are then properly mounted on the strip supports 47 and 82 as previously described so that the control strips 54 and 54′ are under spring tension and will be held taut. Strip 54 in normal use is then set by loosening screws 64 holding strip support 47 and positioning it until a zero reading on dial indicator 65′ is achieved. This automatically centers all elements in the longitudinal direction. Strip carrier 47′ is then adjusted by loosening clamping screws 85 and positioning for proper margin from the edge of the film to the start of the stepping elements, and locked into position.

In the preferred operation, the indexing plunger 71 is retracted by pulling up on knob 76 and the spider 31 and vacuum board 32 are moved to the extreme left and engaged in the first indexing hole of the longitudinal control strip 54. Then the indexing plunger 71′ is moved by lifting the knob 76′ which disengages the indexing plunger 71′ from the indexing holes 63′ of the strip and is moved to the rear and engaged in the rearmost indexing hole of the strip.

The machine is then ready to lower the head and make the first exposure. The head is then lowered and the first element will print in the lower right hand corner of the film. The first exposure is made by depressing the exposure switch 163, and observing the flash through the fresnal lenses 170. The foot pedal 43 is then depressed, thus raising the exposing head 33 from contact with the film on which stepping is taking place.

The threaded knob 76 is then lifted and the elements are then moved to the right and the plunger engaged in the next increment hole. The foot pedal 43 is then released, thus lowering the head again in intimate contact with the films on which stepping is being made and the exposure switch 163 again activated effecting the second step exposure of the element.

This procedure is repeated for the longitudinal steps taking place on this particular film at which time the foot pedal 43 is depressed and the entire spider 31 is again moved to the extreme left and reengaged in the first hole of the longitudinal control strip 54 and the detent or spring loaded plunger for the transverse locator is raised and moved forward to the next transverse locator hole and there engaged. The foot pedal 43 is again released lowering the head 33 and the previously described operations are repeated in sequence thus stepping the second longitudinal row of elements.

The same procedure is repeated, that is, the depression of the foot pedal 43, the spider 31 and attached elements again moved to the extreme left and are engaged in the first indexing hole 63 of the longitudinal control strip 54, the indexing plunger 71' in the transverse control strip 54' is disengaged and moved up forward to the next indexing hole and the food pedal 43 is released, thus lowering the head for the beginning of the step of the third longitudinal row.

The procedure follows in accordance with the above sequence until the complete stepping operation is finished at which time the head is lifted and rotated in its uppermost position by means of operating handle 213 on the ends of the trunnions.

The vacuum is then turned off from the vacuum board and the film on which steps have been made is removed and properly processed. Subsequent films are treated in the same manner by changing if it is two or more color elements by replacing the first negative or positive 211 by another film negative or positive of the same set. A new film is punched and positioned on the vacuum board 32 as previously described, the head 33 lowered and the next series of step-and-repeat exposures made. This is continued until all units of a color job are completed.

It will be evident that the step-and-repeat film after processing will be used to make a printing plate or other final end use product. Automatic register of the final stepped elements may be achieved by punching this final element with the same punch on which the locator hole positions have been punched in the film.

In stepping a multi-color job, positioning and registry after the film has been stepped, properly processed and dried, can be manually checked by positioning the films on movable pins one after another through the locator holes and observing if any error was made in step positioning or if there is any value loss or any other condition that might render one or the other of the films unusable.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a machine having a base, an exposing head mounted on the base, and a support adapted to be translated on the base, indexing means for positioning the support with respect to the base comprising a series of spaced holes having symmetrical shapes and a plunger adapted to selectively engage in said holes, said plunger having a longitudinal axis and a spherical end of greater diameter than the diameter of each of said holes, wherein the plunger end seats in a selected hole so that the longitudinal axis of the plunger is aligned with the center of the selected hole.

2. A machine of claim 1, wherein the spaced holes are contained in a strip attached to the machine.

3. A machine of claim 1, wherein the said plunger is biased toward the said selected hole.

4. A machine of claim 3, wherein the plunger is spring biased.

5. In a step-and-repeat machine for projecting an image from a document to a series of positions on a photosensitive sheet: a base including a frame, a support for photosensitive sheets, means for holding the sheets to the support, means for movably mounting the support on the frame, and indexing means for indexing the movement of the support with respect to the frame; an exposing head including an exposing surface in the exposing head, light means mounted in said exposing head for projecting light through the exposing surface, and holding means for holding the document on the exposing surface; means for supporting the exposing head from the base extending between the head and base including means for swinging the head between an exposing position at which the exposing surface is parallel and adjacent the photosensitive sheet and a position at which the head is away from the photosensitive sheet and the exposing surface is substantially perpendicular to the sheet, and means for effecting rotational movement of the head during the portion of the swing away from the photosensitive sheet and translational movement of the head during the portion of the swing adjacent the photosensitive sheet, whereby the exposing surface and document are brought into exposing position adjacent the photosensitive sheet by movement of the exposing surface through parallel planes.

6. A machine of claim 5, having counterbalancing means connected to the head to balance the head at midpoint in its swing, and to bias the head downwardly below midpoint and upwardly above midpoint.

7. A machine of claim 5, in which the said translational movement is effected by means including lever arms attached to the head and an elongated slot in each of said lever arms.

References Cited by the Examiner

UNITED STATES PATENTS

| 95,999 | 10/69 | Griswold | 95—4 |
| 1,261,177 | 4/18 | Strong | 95—73 |
| 1,647,246 | 11/27 | Ogden | 95—73 |
| 1,750,294 | 3/30 | Bassist | 95—76 |
| 1,962,741 | 6/34 | Jones | 95—73 |
| 2,454,097 | 11/48 | Schleimer | 95—74 |
| 2,842,037 | 7/58 | Gobeille et al. | 95—76 |
| 3,093,050 | 6/63 | Smith | 95—76 |
| 3,147,683 | 9/64 | Hulen | 95—73 |

FOREIGN PATENTS 27,264 1911 Great Britain.

EVON C. BLUNK, *Primary Examiner.*